United States Patent
Butcher

(10) Patent No.: US 8,695,034 B2
(45) Date of Patent: Apr. 8, 2014

(54) DELIVERING ON SCREEN DISPLAY DATA TO EXISTING DISPLAY DEVICES

(75) Inventor: Lawrence Llewelyn Butcher, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 823 days.

(21) Appl. No.: 11/849,163

(22) Filed: Aug. 31, 2007

(65) Prior Publication Data

US 2009/0064231 A1    Mar. 5, 2009

(51) Int. Cl.
*H04N 7/173* (2011.01)
*H04N 7/16* (2011.01)
*H04N 5/445* (2011.01)
*G06F 3/00* (2006.01)

(52) U.S. Cl.
USPC .............. 725/37; 370/518; 348/584; 715/203

(58) Field of Classification Search
USPC .............. 725/135, 37, 136, 139, 38; 370/518; 348/584, 658, 564; 715/203
See application file for complete search history.

(56) References Cited

U.S. PATENT DOCUMENTS

| | | | |
|---|---|---|---|
| 5,691,986 A | | 11/1997 | Pearlstein |
| 5,917,830 A | * | 6/1999 | Chen et al. ................... 370/487 |
| 5,966,120 A | * | 10/1999 | Arazi et al. ................... 715/724 |
| 6,747,983 B1 | * | 6/2004 | Knutson et al. .............. 370/412 |
| 6,788,710 B1 | * | 9/2004 | Knutson et al. .............. 370/535 |
| 2003/0025685 A1 | | 2/2003 | Shirasaki et al. |

FOREIGN PATENT DOCUMENTS

| | | |
|---|---|---|
| CN | 1397921 | 2/2003 |
| EP | 0980185 | 2/2000 |
| EP | 99113881.9 | 2/2000 |
| JP | 2000-188614 | 7/2000 |
| WO | WO-9533342 | 12/1995 |

OTHER PUBLICATIONS

"8029P020PCT ISR and WO Mailed Nov. 14, 2008 for PCT/US2008/069445", (Nov. 14, 2008), Whole Document.
Anonymous, "Datenflusskontrolle", Wikipedia [online]retrieved from the internet: URL: http//de.wikipedia.org/w/index.php?title=Datenflusskontrolle&oldid=35332605. Retrieved on Oct. 29, 2008—English—Data Flow Control.
Int'l Preliminary Report on Patentability for Int'l Application No. PCT/US2008/069445 mailed Mar. 11, 2010.
First Office Action for Chinese Patent Application No. 200880105182.1, Mailed Jul. 25, 2011, 9 pages.
Office Action from Taiwan 097126136 mailed Jun. 3, 2011, 5 pgs.
Office Action from CN200880105182.1 mailed Dec. 31, 2011, 8 pgs.
Official Action dated Oct. 29, 2012 (+ English translation), in Japanese Patent Application No. 2010-522991, 4 pages.
Rejection Decision dated Dec. 20, 2012 (+ English translation), in Taiwan Patent Application No. 097126136, 12 pages.
Office Action dated Jul. 30, 2012, in Chinese Patent Application No. 200880105182.1, 8 pages.

* cited by examiner

*Primary Examiner* — Pankaj Kumar
*Assistant Examiner* — Reuben M Brown
(74) *Attorney, Agent, or Firm* — Blakely Sokoloff Taylor Zafman LLP

(57) ABSTRACT

A method and apparatus for delivering screen display data to existing display devices. Some embodiments of an apparatus include an interface to receive an input stream for a display device. The apparatus further includes a module to generate on screen display data for the display device. The apparatus includes a multiplexer, the multiplexer to multiplex the on screen display data into the input stream.

24 Claims, 6 Drawing Sheets

DELIVERING ON SCREEN DISPLAY DATA TO EXISTING DISPLAY DEVICES

TECHNICAL FIELD

Embodiments of the invention generally relate to the field of networks and, more particularly, to a method and apparatus for delivering screen display (OSD) data to existing display devices.

BACKGROUND

A network may include the interconnection of multiple devices, such as personal electronic entertainment devices. In such a network, the interconnected devices may transfer and share data, including media data. In such a network, there may be data such as menus and other informational displays that is provided to one or more display devices in the network. In general, such data may be referred to as an on screen display (OSD). An OSD is an image that may be presented together with one or more other images on a screen. The OSD may or may not be transparent such that the OSD and another image can be simultaneously seen. The OSD may be purely informational (such as an OSD indicating the current channel of a television or a stock ticker) or may include a graphical user interface (GUI) that allows a user to select a feature through, for example, a remote control device. The OSD is often generated from a different source and is superimposed on another image such that a portion of the other image is partially or completely obscured while the OSD is displayed. For example, a television, DVD player, STB (set top box), or other device can generate information such as volume, channel, time information, or a menu in response to signals from a remote control device or the pressing of buttons on the television, set top box, DVD player, or other video source device. In addition to being used in TVs, OSDs have also been used in connection with computer displays. Some video equipment boxes may include more than one video source device. Some video devices are both video source devices and video display devices.

In conventional systems, the OSD signals can be generated inside control circuitry of the television or inside other devices such as a set top box or DVD (Digital Versatile Disc) player and be provided remotely from these devices to the television. For example, when a remote control device provides a channel change command to a television, control circuitry in the television may cause an OSD with the new channel to appear on the television screen. Alternatively, if the remote control device provides a channel change command to a set top box, the set top box may generate OSD signals and provide the OSD signals to the television to be displayed on the television screen.

FIG. 1 illustrates a conventional system that includes a video signal source 12 that provides compressed or uncompressed video to a set top box 16. Examples of the video source include a cable television outlet and a satellite television receiver. Examples of set top boxes include cable television boxes and satellite television boxes. Source 12 also may provide audio signals. Set top box 16 provides uncompressed analog video signals or uncompressed digital video signals to a display control circuitry 20 of a television 18. As an example, uncompressed digital video signals may be provided between set top box 16 and display control circuitry 20 of television 18 through a High Definition Multimedia Interface (HDMI). Display control circuitry 20 could receive video from other devices including a DVD player, DVR (digital video recorder), VCR (video cassette recording device), hand held video source device, or other device, in addition to or in replace of set top box 16.

The video signals are provided from display control circuitry 20 to display 30 to be displayed on screen 34. In the case in which OSDs are generated by set top box 16, the OSDs may be combined as part of the uncompressed video signals and sent to television 18 to be displayed. Display control circuitry 20 includes a frame buffer 24 to present OSD signals that are combined with the uncompressed video in blender circuitry 26. Blender circuitry 26 provides the combined signals to display 30 to be displayed on screen 34.

However, in practice, a network may include both newer and older devices, with the older devices not supporting all protocol requirements of the new system. Conventional devices may not support protocol requirements for OSD data and similar requirements. For this reason, there may be no interface for the input of the information display information to the older display devices, and thus the older devices in general may be unable to display such informational information.

SUMMARY OF THE INVENTION

A method and apparatus are provided for delivering on screen display data to existing display devices.

In a first aspect of the invention, an apparatus include an interface to receive an input stream for a display device, and a module to generate on screen display data for the display device. The apparatus further includes a multiplexer, wherein the multiplexer is to multiplex the on screen display data into the input stream.

In a second aspect of the invention, an apparatus includes an interface for an input stream, and a de-multiplexer, the de-multiplexer to de-multiplex on screen data from other input data in the input stream. The apparatus includes a module to interpret the on screen display data, display control circuitry to generate a display including an on screen display based on the on screen display data, and a screen to display the generated display.

In a third aspect of the invention, a method includes generating on screen data for a display device. The method further includes receiving an input stream for the display device, and multiplexing the on screen display data into the input stream. The multiplexed input stream and on screen display data is provided to the display device.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
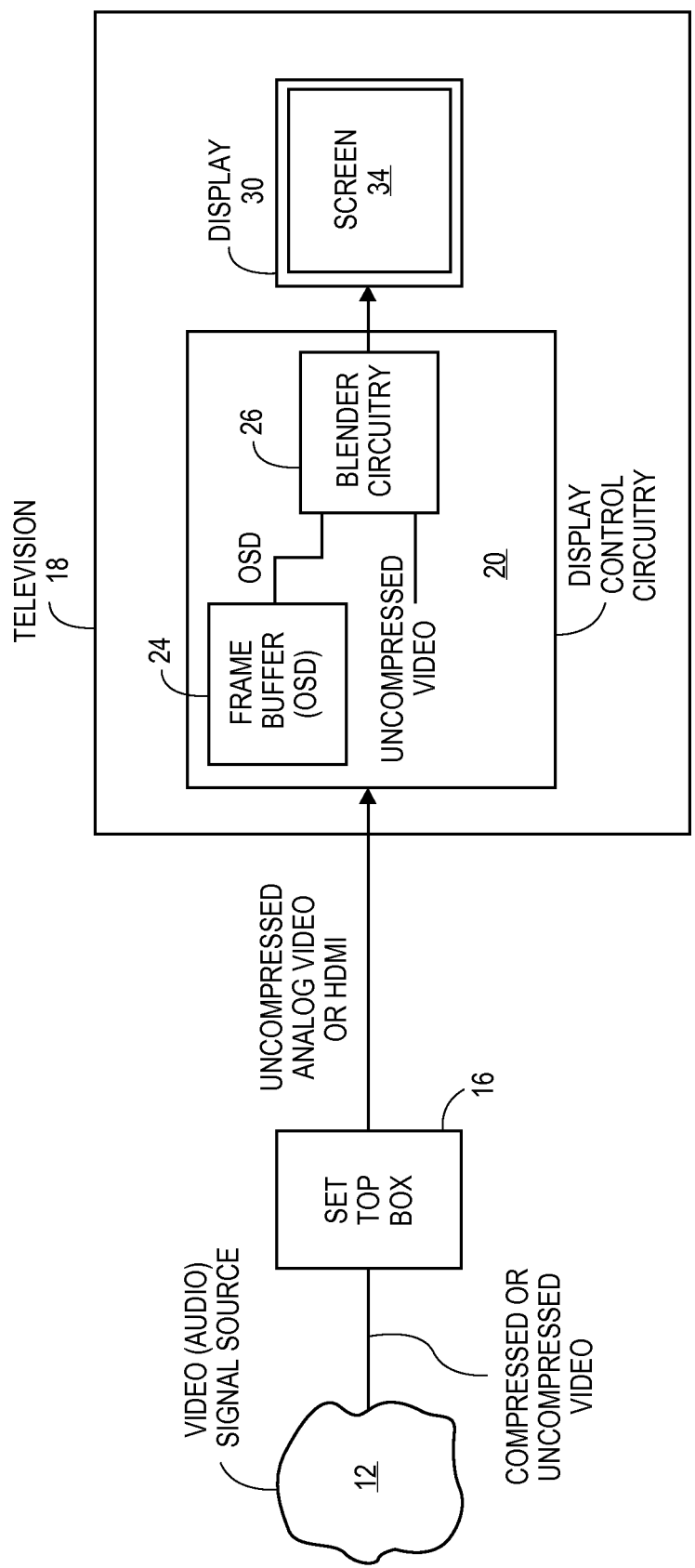
FIG. 1 illustrates a conventional system that includes a video signal source that provides video to a set top box.

Embodiments of the invention are generally directed to delivering on screen display data to existing display devices.

In some embodiments, a network may include multiple interconnected devices that share data. The devices may include, for example, entertainment devices that share media data. In some embodiments, a system or process is provided for delivering on screen display (OSD) data to existing display devices. In some embodiments, the existing display devices are devices that do not include a protocol for the In an embodiment, a system includes ingress, storage, and egress devices connected by a network. These devices are intended to cooperate to deliver improved functionality to the user. In a specific implementation, a user may be able to interact, via, for example, an extensible user interface, with all devices on the network, and may be able to access all content that is on the network or that is otherwise available to the network.

Implementing a network in which the network devices have been designed for operations of the network protocol may be relatively straight-forward, such as in implantation of a new all-silicon-image environment. However, if a network system is being phased in, this may require customers and users to utilize non-silicon-image technology. In some embodiments, a process or system is provided for the delivery of user-interface information to existing third-party devices. In some embodiments, the information is intended to be delivered in a manner in which there are only minimum requirements for change to external interfaces. In some embodiments, a general method is provided to enable inter-operations with existing devices, thereby allowing the solution to be applied with multiple system partners. In some embodiments, a system is provided that enables network operation during any transition to the new protocol. In some embodiments, a process is provided to enable the provision of services to existing devices in the interconnection network.

In some embodiments, there is a need to deliver on-screen display data to users in a network at any display device in the network, which may include multiple devices. In some operations, one or more display devices may be existing display devices that have not been designed for network operation. In providing such data, it is noted that that existing display-side chips for network devices generally can accept compressed data and render such data to a display. Such existing display-side chips generally are also capable of merging vendor-specific user interface data to the display. Thus, the display of such information is generally possible if such data may be provided to the devices.

However, an existing display-side devices may have no specified interface for insertion of the on-screen data can be inserted. In some embodiments, a system or process is provided for providing OSD data to a display device via an interface. In order to utilize existing devices in a practical manner, it is advantageous to use existing interfaces. For example, existing display devices typically have a way to accept a video data input stream such as MPEG (Motion Pictures Experts Group) transport streams. In particular, many existing devices have an interface such as a cable-card interface (also referred to as a Cardbus), which is a standard method of injecting compressed transport stream data. A CableCard is a PCMCIA (Personal Computer Memory Card International Association) sized card, with such card allowing, for example, digital cable service to the display device without the need for a set-top cable box. A transport stream includes data that is provided pursuant to a communications protocol for audio, video, and data. A transport stream is specified in MPEG-2, and is intended to allow for multiplexing of digital video and audio and to synchronize the output. In some embodiments, a system or method utilizes an existing interface, such as a digital cable interface, to inject display data into a transport stream. In an implementation, a transport stream provides a sequence of 188-byte data packets. In this sequence, each packet has a standard header and an application-specific data payload. Each transport stream packet contains a PID (Packet Identifier), which is a 13-bit value that describes the type of the associated packet. Some PID values are well specified, including coordinated values for MPEG-2 Part 1, Systems—ISO/IEC (International Organization for Standardization/International Electrotechnical Commission) Standard 13818-1 (Information Technology—Generic Coding of Moving Pictures and Associated Audio: Systems) and ATSC (Advanced Television Systems Committee) Standards. Display devices generally depend on the standard contents of known PID packets. One well-known PID value is "0x1FFF", signifying that the packet is empty. In some embodiments, a display device is capable of de-multiplexing packets based on packet PID values, and collecting together like data for further processing.

In a system, transport streams are commonly used when there is one-way communication. In this communication, the sender does not receive feedback from the receiver, and thus the sender is required to behave in a way which is guaranteed to not exceed receiver capability. A "buffer model" is used to ensure this, in which the buffer absorbs data as required. In such a process, a sender and a receiver may separately agree to implement data transfers according to the required buffer model, and, since both have agreed with regard to behavior, there is assurance that the system will not encounter resource problems in transmission. However, in some embodiments a network protocol does not utilize a buffer model, but rather provides activity on a "fast as possible" basis. In some embodiments, display data is provided to an existing display chip using an existing interface, and that data is inserted in a manner so as avoid violating the existing buffer model of, for example, regular MPEG data.

In some embodiments, OSD data is inserted as data packets into a transport stream. In some embodiments, an OSD data packet is assigned a PID value, with the assignment being from, for example, a user-defined range, a standards body, or dynamically from the normal content range. In some embodiments, the OSD data packet is inserted when an unused PID is detected as a substitute for the unused data packet. In some embodiments, an OSD source device may insert or multiple OSD data into an existing transport stream using idle transport stream packets, substituting OSD packets for packets containing a PID for idle (PID 0x1FFF). In addition to substituting idle packets, the OSD source device might insert the OSD data in unneeded packets that are not idle but are known to contain data which will be discarded by the display device. Such data may include, but is not limited to, alternate audio or second video data. Such unused data may be determined on a case-by-case, time-by-time basis.

In a process in which OSD packets are inserted to substitute for unneeded (idle or unused) data packets, the insertion of the OSD packets does not operate to speed up nor slow down the delivery of the other content in the transport stream, and thus the buffer model of the other content in the transport stream is not harmed. In some embodiments, the OSD source device may in addition or alternatively deliver the existing transport stream to the display device using a faster clock speed than the original clock speed for the transport stream, thus generating room for extra transport stream packets to be inserted in gaps. In circumstances in which case that the clock is changed, the OSD source device may be required to carefully update timestamp info in existing Transport Stream data to avoid data overrun issues.

In some embodiments, on screen data is de-multiplexed in the existing display device, and is acted upon by the display device. However, the existing display device generally cannot act instantly on the injected on-screen data, and thus there is a potential for the injected OSD data to use up buffer space allocated to handle it. In some embodiments, in order to prevent the on screen data from out-running the existing display device, the source of the OSD may receive feedback from the existing display device regarding the present state of the buffer, and operation to throttle data as necessary. In some embodiments, feedback provided regarding buffer status may be implemented by utilizing another existing interface in the existing display device. In an example, an IIC master in the existing OSD device might announce buffer status periodically, or may make announcements in response to events. However, the feedback is not limited to any particular interface, but may utilize any interface that is available to provide the required feedback. In some embodiments, Cable Card signals may also be used to indicate buffer status if a full-duplex Cable Card interface is available in an existing display device card.

In other embodiments, an OSD source device may include information regarding the display device, such as a "rendering model" of the display device, and may utilize such information to predict how long different commands will take to execute. Using predicted timing based on the rendering model, the OSD source device could be required to throttle back on screen display commands until the source device is certain that the buffer in the existing display device is at a safe level.

In some embodiments, a module, including software commands or logic, on the existing display device provide for operations to receive and de-multiplex Raven OSD data (via PID filtering) and rendering it to the display. In some embodiments, software, logic, or other commands on the existing display device provide for delivering the buffer status from the existing display device to the on screen display source. In this process, an existing interface may be used to carry the new data.

In some embodiments, software, logic, or other commands on the existing display device may also be responsible for delivering user event information from the existing display device to the on screen display source. In some embodiments, an existing interface may be used to carry the user event data.

In some embodiments, an on screen display source device in the display is responsible for accepting concurrent display update information from one or more network-attached devices, multiplexing the data together, merging the multiplexed data with the existing transport stream, and delivering the data to the existing display chip.

While the discussion provided herein regards OSD data, other data, such as, for example, instance control information, may also be delivered to an existing Display Device using the input stream insertion technique provided here.

Figure 2:
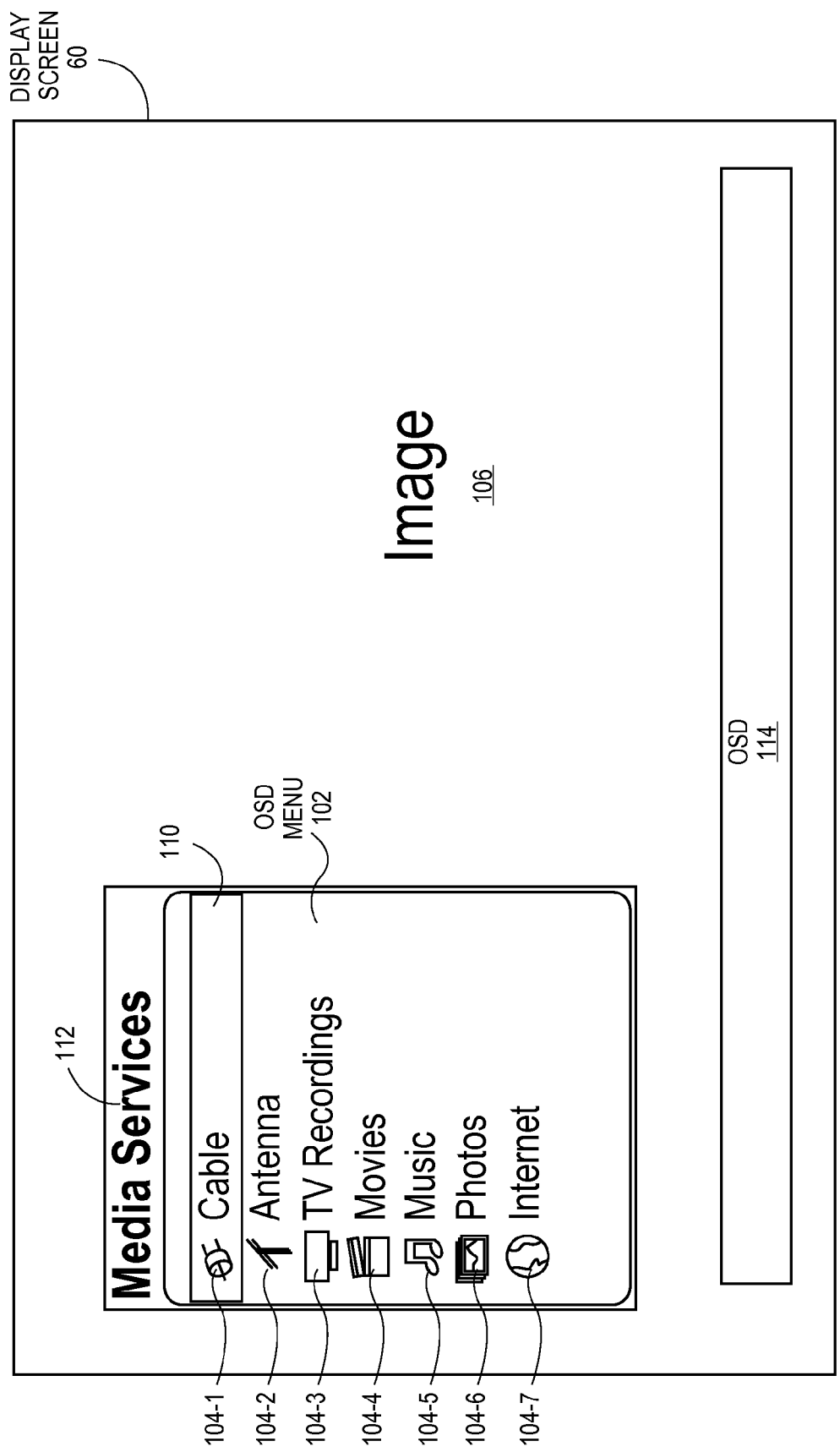
FIG. 2 is an illustration of an on screen display in an embodiment of the invention.

FIG. 2 is an illustration of an on screen display in an embodiment of the invention. In this illustration, an image 106 and an OSD menu 102 are provided on a screen 60. The OSD menu 102 includes icons and words 104-1 (Cable), 104-2 (Antenna), 104-3 (television Recordings), 104-4 (Movies), 104-5 (Music), 104-6 (Photos), and 104-7 (Internet). Icon and words 104-1 are highlighted (selected) as shown by an identifier band 110. The words "Media Services" appears at the top of the OSD menu to describe what is included in the menu. A second OSD 114 is also included in screen 60. OSD 114 may be purely informational (such as a stock ticker) or an interactive OSD like OSD menu 102. An interactive OSD is one which a user can select an item on the OSD to activate. In some embodiments of the invention, the OSD menu 102, the OSD 114, or both are provided to an existing display device via insertion in the input stream for the display device.

Figure 3:
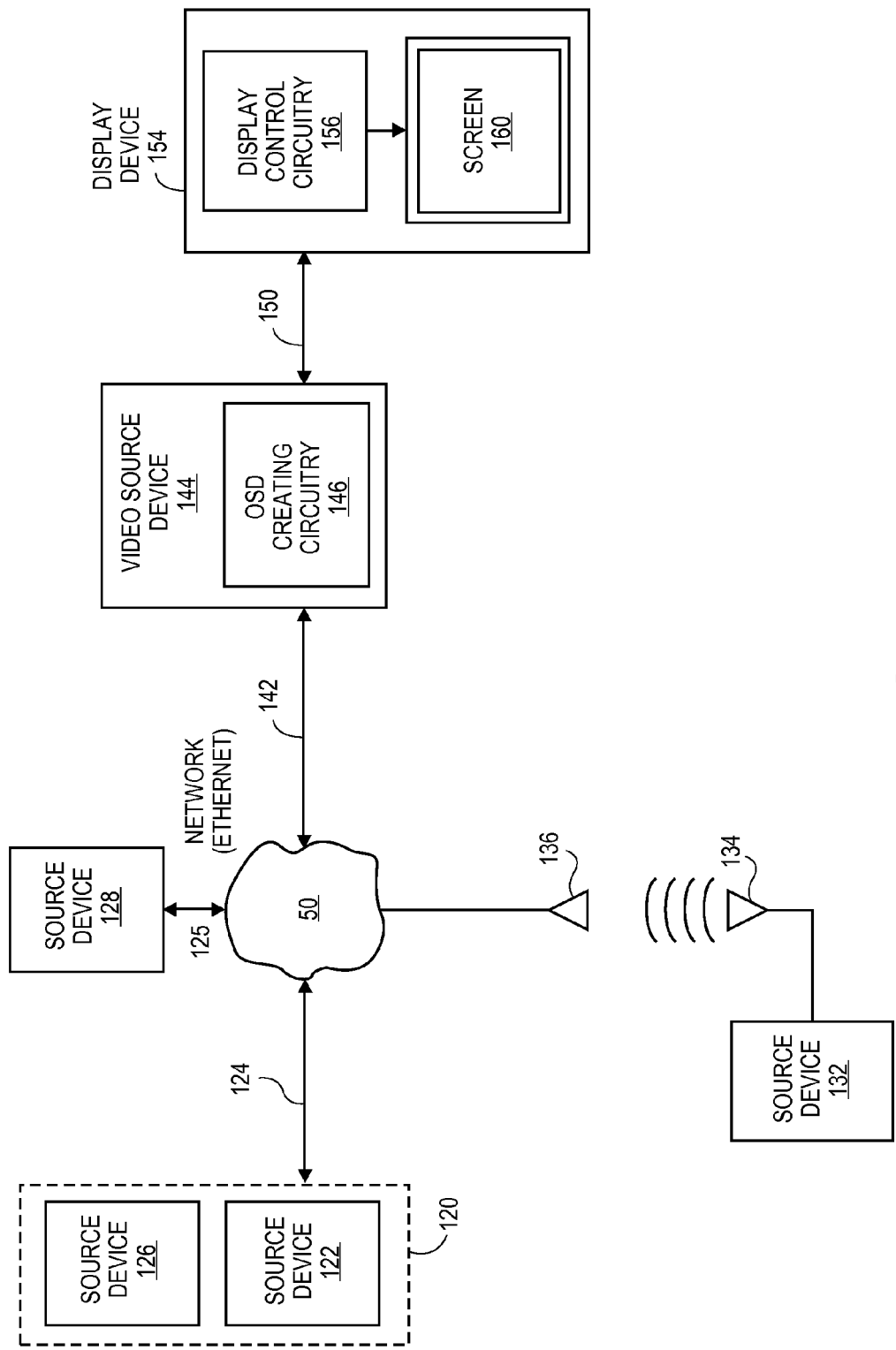
FIG. 3 is an illustration of the delivery of on screen data to a display device in some embodiments.

FIG. 3 is an illustration of the delivery of on screen data to a display device in some embodiments. In this illustration, a video device 144 is coupled to a network 50 through conductors 142. In addition, video source device 122 and video source device 126 are included in video equipment box 120, and are coupled to network 50 through conductors 124. Video device 128 is coupled to network 50 through conductors 125. Video source device 132 is wirelessly coupled to network 50 through wireless antennas 134 and 136.

The video source device 144 includes an OSD creating circuitry 146 to generate OSD signals for display. The OSD signals may be based at least in part on signals from the other source devices in the network, devices 122, 126, 128, and 132. The video source device 144 is coupled with a display device 154, which may commonly be a television. (While the video source device and the display device are shown as separate entities, in some embodiments the video source device and the display device may be combined into one entity.) The display device 154 includes display control circuitry to provide signals for a display screen 160. However, the display device 154 may be an existing device that does not include an interface for the OSD data signals. In some embodiments, the video source device 144 will generate the OSD signals, and will multiplex the OSD data as data packets in an existing input stream for the display device 160.

Figure 4:
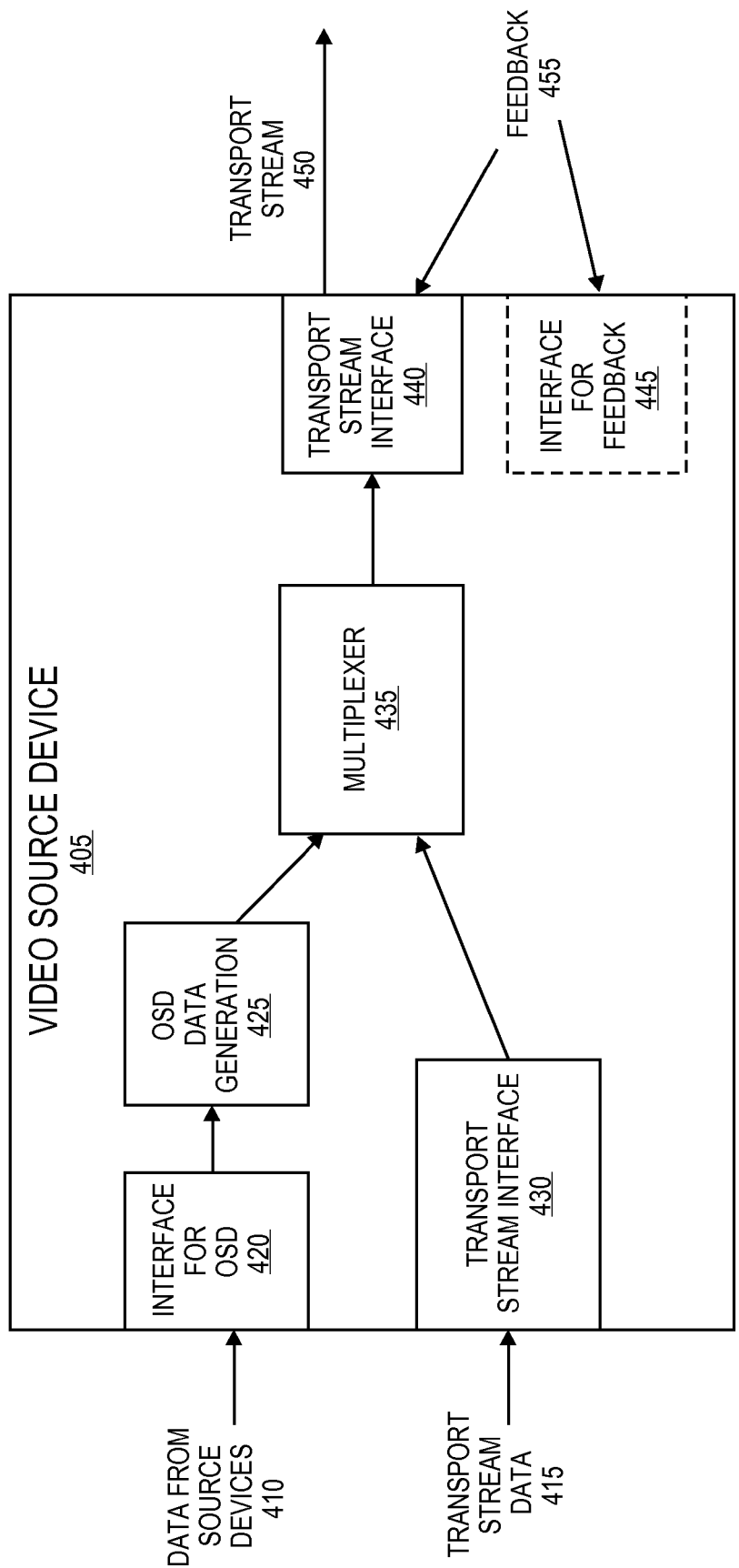
FIG. 4 is an illustration of a video source device to provide an on screen display to a display device.

FIG. 4 is an illustration of a video source device to provide an on screen display to a display device. In some embodiments, a video source device 405 includes a transport stream interface such as a cable-card interface 430 to accept a transport stream 415 for a display device. The source device 405 may further include an interface 420 to receive data from other source devices 410. The source device may include an OSD data generator to generate the OSD data to be provided to a display device. The video source device 405 includes a multiplexer 435 to insert OSD data into the existing transport stream at safe locations within the transport stream.

In some embodiments, the video device source 405 includes a transport stream interface 440 to output the multiplexed transport stream 450 to a display device. In some embodiments, the video source device 405 has the ability to accept information back from an existing display device via a standard or device-specific interface. In this illustration, the video source device 455 may further receive display device feedback 455 either through the cable interface 440 or through another interface. In some embodiment, the video source device 405 includes the ability to cooperate or independently calculate a buffer model to avoid overrunning resources in the existing display device. While for simplicity of illustration the video source device 405 is shown as paired with a display device, in some embodiments a single source device may connect with multiple devices or to one of set of devices.

Figure 5:
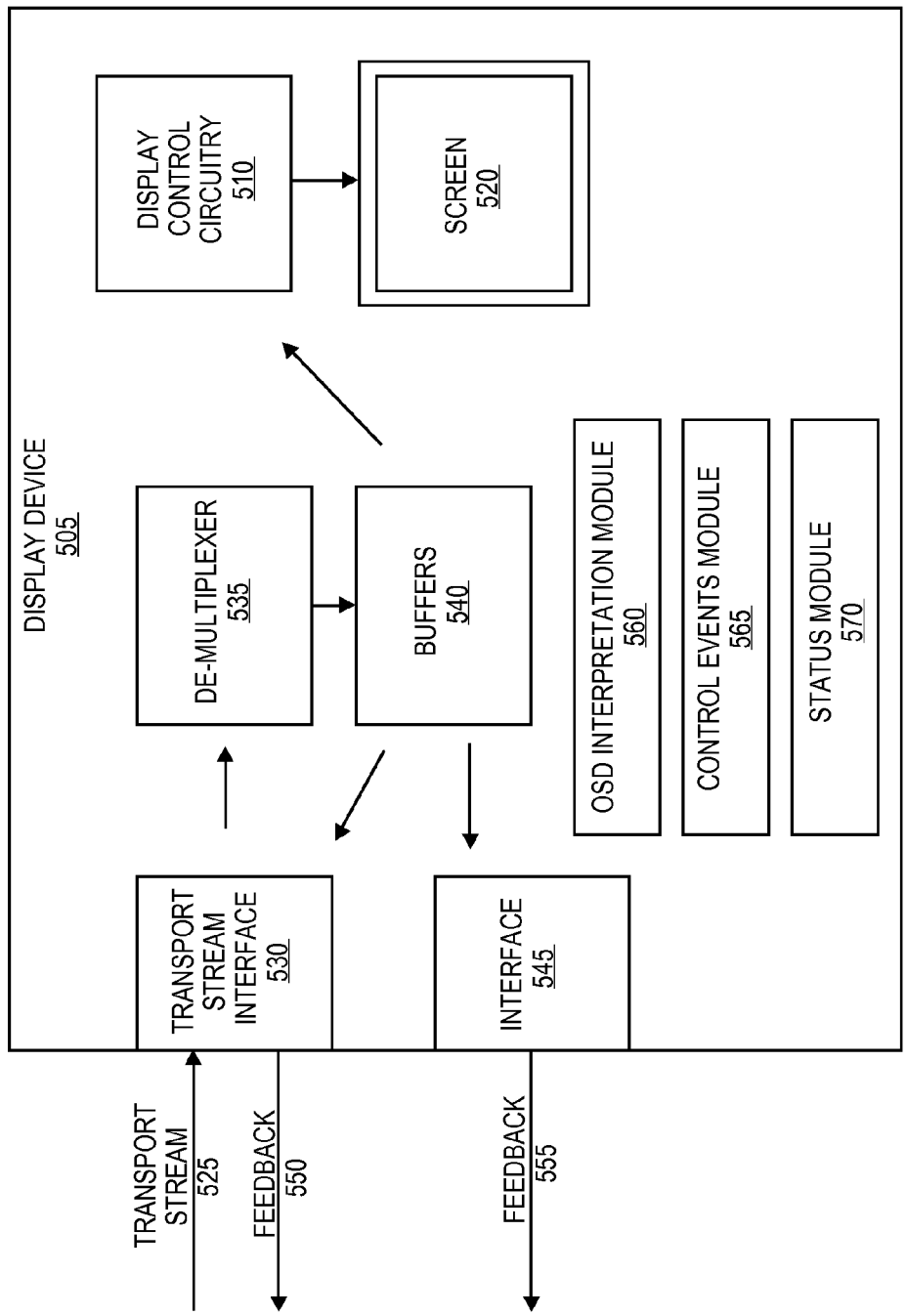
FIG. 5 illustrates an embodiment of a display device.

FIG. 5 illustrates an embodiment of a display device. In this illustration, the display device 505 includes a transport stream interface 530, such as a cable-card interface, to accept a transport stream 525. In this instance, the transport stream 525 may include normal transport stream data and OSD data. The display device 505 further includes a de-multiplexer 535 to separate data, including the separation of OSD data from other transport stream data. The Display device may include buffers 540 to buffer received data. The display device 505 may provide feedback 550-555 regarding the status of the buffers for OSD data, which may be provided via the transport stream interface 530 if this is bi-directional, or via another interface. The display device 505 may include an OSD interpretation module 560 to interpret the received OSD data, and a control events module 565 to provide for communication with external network devices regarding events, such as remote control events connected to the use of the on screen display. The display module 505 may further include a module provide for communication with an external device regarding the status of OSD-related resources, thus enabling agreement in a buffer model.

Figure 6:
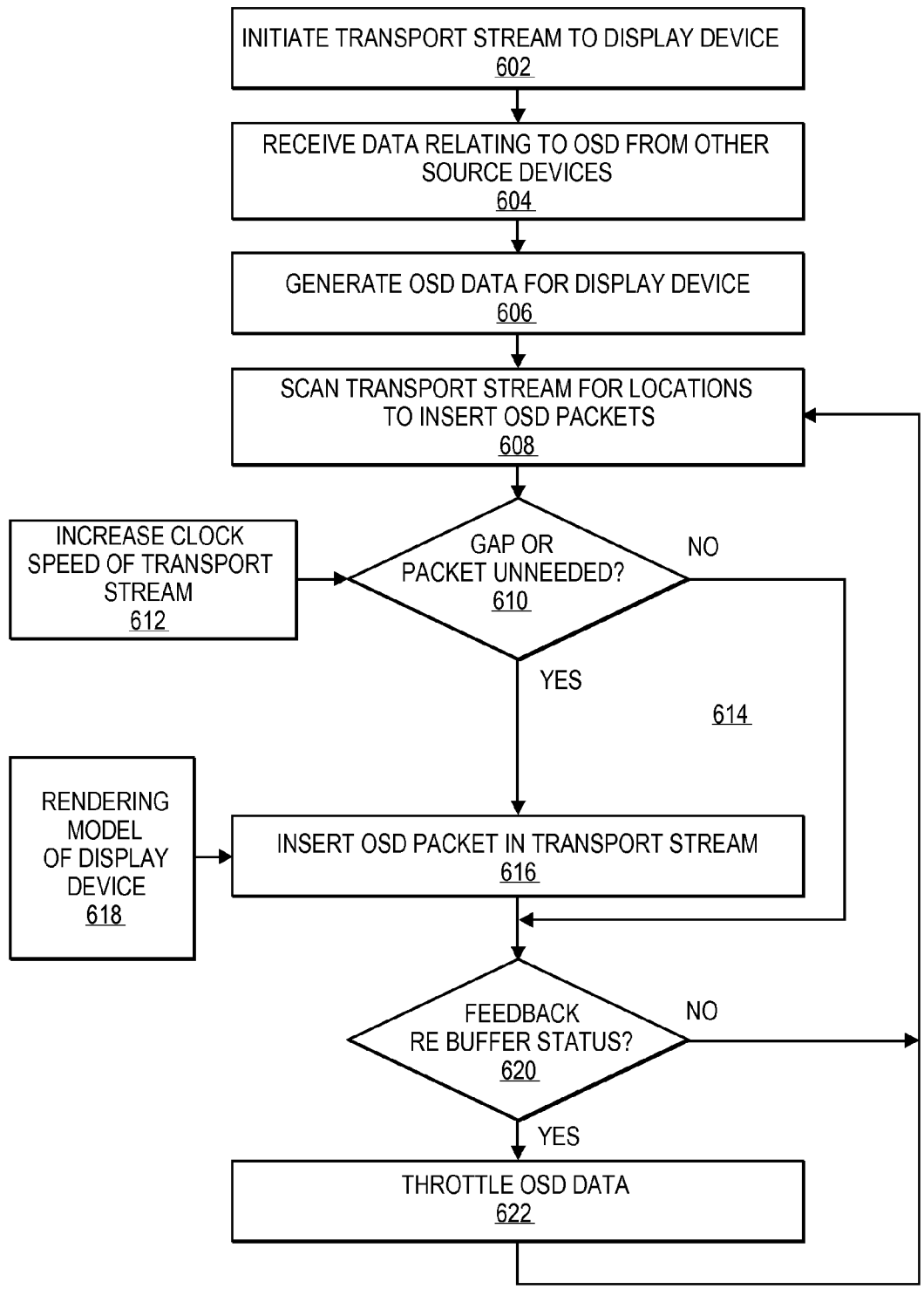
FIG. 6 provides a flowchart to illustrate an embodiment of a process for providing an on screen display.

FIG. 6 provides a flowchart to illustrate an embodiment of a process for providing an on screen display. In this illustration, a transport stream may be initiated for a display device 602. OSD-related data may be received from one or more video source device 604, and OSD data from the display device is generated for the display device 606. The transport stream is then scanned for locations to insert OSD data 608. If a data packet is unneeded 610 (idle or otherwise unused) or there is a gap in transmission, then an OSD packet is inserted in the transport stream 616, either as a substitute for the unused packet or as an insertion in the gap. The process may include increasing the clock speed of the transport stream 612, which will create gaps in the transport stream. In addition, the insertion of packets may include the use of a rendering model of the display device 618 to anticipate how the display device will respond to the received packets. In addition, if feedback is received from the display device indicating an issue regarding the status of the buffers for OSD data 620, the OSD data may be throttled to prevent an overrun of the resources of the display device 622.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
   an interface to receive an input stream for a display device from a first source device, the input stream including a plurality of input data packets;
   a module to generate on screen display data for the display device, generating on screen display data including the module generating a plurality of on screen display data packets, wherein the on screen display data is not based on the input stream received from the first source device;
   a multiplexer to multiplex the on screen display data into the input stream to generate a transport stream, wherein multiplexing the on screen display data into the input stream includes:
   scanning the input stream for locations in the input stream to insert on screen data,
   substituting a first on screen display data packet for a first input data packet of the received input data packets from the first source device, the first input data packet being an unneeded data packet, inserting a second on screen display data packet into a gap in the received input stream, wherein inserting the second on screen display data packet includes increasing a clock speed of the generated transport stream if needed to generate a gap in the input stream for the insertion of the second on screen display data packet, and throttling the multiplexing of the on screen display data into the input stream as necessary to avoid overrunning a buffer of the display device; and a connection with an interface of the display device to provide the transport stream to the display device.

2. The apparatus of claim 1, wherein the first input data packet is an idle data packet.

3. The apparatus of claim 1, wherein the first input data packet is a data packet that would be unused by the display device.

4. The apparatus of claim 3, wherein the first input data packet includes one or more of alternate audio or second video data.

5. The apparatus of claim 1, further comprising a model of the display device, and wherein multiplexing the on screen display data into the input stream includes determining based on the model of the display device how the display device will respond to insertion of an on screen display data packet, and wherein the throttling of the on screen display data is based at least in part on the determination of how the display device will respond to the insertion of the on screen display data packet.

6. The apparatus of claim 1, wherein the input stream comprises an MPEG (Motion Pictures Experts Group) transport stream.

7. The apparatus of claim 1, wherein the generation of the on screen display data is based at least in part on signals received from a second source device.

8. The apparatus of claim 1, wherein the display device does not include a specified interface for insertion of the on screen display data.

9. The apparatus of claim 1, wherein increasing a clock speed of the generated transport stream includes updating timestamp values to avoid data overrun of the buffer of the display device.

10. A system comprising:
    a video source device including:
        an interface to receive an input stream from a first source device, the input stream including a plurality of input data packets,
        a module to generate on screen display data, generating the on screen display data including generating a plurality of on screen display data packets, wherein the on screen display data is not based on the input stream received from the first source device, and
        a multiplexer to multiplex the on screen display data into the input stream to generate a transport stream, wherein multiplexing the on screen display data into the input stream includes:
            scanning the input stream for locations in the input stream to insert on screen data,
            substituting a first on screen display data packet for a first input data packet of the plurality of input data packets, the first input data packet being an unneeded data packet,
            inserting a second on screen display data packet into a gap in the received input stream, wherein inserting the second on screen display data packet includes increasing a clock speed of the generated transport stream if needed to generate a gap in the input stream for the insertion of the second on screen display data packet, and
            throttling the multiplexing of the on screen display data into the input stream as necessary to prevent overrunning a display device buffer; and
    a display device including:
        an interface for the transport stream,
        a de-multiplexer, the de-multiplexer to de-multiplex the on screen display data packets from the input data in the transport stream,
        a buffer for the on screen display data,
        a module to interpret the on screen display data,
        display control circuitry to generate a display including an on screen display based on the on screen display data, and
        a screen to display the generated display.

11. The system of claim 10, wherein the interface for the transport stream comprises a cable card interface.

12. The system of claim 10, further comprising a module to provide feedback regarding a status of the buffer.

13. The system of claim 12, wherein the feedback is provided via the interface for the transport stream.

14. The system of claim 12, further comprising a second interface, wherein the feedback is provided via the second interface.

15. The system of claim 10, wherein the transport stream comprises an MPEG (Motion Pictures Experts Group) transport stream.

16. A method comprising:
    generating on screen data for a display device, generating the on screen data comprising generating a plurality of on screen display data packets;
    receiving an input stream for the display device from a first source device, the input stream including a plurality of input data packets, wherein the on screen display data is not based on the input stream received from the first source device;
    multiplexing the on screen display data into the input stream to generate a transport stream, wherein multiplexing the on screen display data into the input stream includes:
        scanning the input stream for locations in the input stream to insert on screen data,
        substituting a first on screen display data packet for a first input data packet of the plurality of input data packets, the first input data packet being an unneeded data packet,
        inserting a second on screen display data packet into a gap in the received input stream, wherein inserting the second on screen display data packet includes increasing a clock speed of the generated transport stream if needed to generate a gap in the input stream for the insertion of the second on screen display data packet, and
        throttling the multiplexing of the on screen display data into the input stream as necessary to avoid overrunning a buffer of the display device; and
    providing the transport stream including the multiplexed input stream data and on screen display data to the display device.

17. The method of claim 16, further comprising receiving information regarding an on screen display from one or more video source devices, the one or more video source devices not including the first source device, wherein generating on screen display data is based at least in part on the received information.

18. The method of claim 16, further comprising receiving feedback from the display device regarding a status of the buffer of the display device.

19. The method of claim 16, wherein the first input data packet is an idle data packet.

20. The method of claim 16, wherein the first input data packet is a data packet that will not be used by the display device.

21. The method of claim 16, wherein providing the transport stream to the display device includes providing data to an input stream interface.

22. The method of claim 21, wherein the input stream interface includes a cable card interface.

23. The method of claim 16, further comprising receiving the transport stream and demultiplexing the on screen display data packets from the input data packets.

24. The method of claim 23, further comprising interpreting the on screen display data packets, and generating a display including an on screen display based on the on screen display data packets.

* * * * *